United States Patent
Kataria et al.

(10) Patent No.: US 11,327,782 B2
(45) Date of Patent: May 10, 2022

(54) SUPPORTING MIGRATION OF VIRTUAL MACHINES CONTAINING ENCLAVES

(71) Applicant: VMWARE, INC., Palo Alto, CA (US)

(72) Inventors: Alok Nemchand Kataria, Pune (IN); Martim Carbone, Palo Alto, CA (US); Deep Shah, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 267 days.

(21) Appl. No.: 16/561,051

(22) Filed: Sep. 5, 2019

(65) Prior Publication Data
US 2021/0019166 A1 Jan. 21, 2021

(30) Foreign Application Priority Data
Jul. 19, 2019 (IN) .............................. 201941029237

(51) Int. Cl.
*G06F 9/455* (2018.01)
*H04L 9/08* (2006.01)
*H04L 29/06* (2006.01)

(52) U.S. Cl.
CPC .......... *G06F 9/45558* (2013.01); *H04L 9/083* (2013.01); *H04L 63/0428* (2013.01); *G06F 2009/4557* (2013.01)

(58) Field of Classification Search
CPC ............ C12Q 1/6883; C12Q 2600/106; C12Q 2600/118; C12Q 2600/156; G06F 11/1438; G06F 11/1484; G06F 2009/4557; G06F 2009/45587; G06F 21/602; G06F 21/606; G06F 21/6209; G06F 21/74; G06F 9/45558; H04L 63/0428; H04L 63/062; H04L 9/083; H04L 9/0894
See application file for complete search history.

(56) References Cited

U.S. PATENT DOCUMENTS

| 8,208,637 | B2* | 6/2012 | Ellison ................. H04L 9/3234 380/278 |
| 2002/0018571 | A1* | 2/2002 | Anderson ............... H04L 9/083 380/277 |
| 2017/0185533 | A1* | 6/2017 | Rozas ....................... H04L 9/32 |
| 2018/0183580 | A1* | 6/2018 | Scarlata ................ G06F 9/4856 |
| 2020/0412535 | A1* | 12/2020 | Cui ........................ H04L 9/0897 |

OTHER PUBLICATIONS

J. Gu et al., "Secure Live Migration of SGX Enclaves on Untrusted Cloud," 2017 47th Annual IEEE/IFIP International Conference on Dependable Systems and Networks (DSN), 2017, pp. 225-236, doi: 10.1109/DSN.2017.37. (Year: 2017).*

* cited by examiner

*Primary Examiner* — Jorge A Chu Joy-Davila
(74) *Attorney, Agent, or Firm* — Patterson & Sheridan, LLP

(57) ABSTRACT

The present disclosure provides an approach for migrating the contents of an enclave, together with a virtual machine comprising the enclave, from a source host to a destination host. The approach provides a technique that allows the contents of the enclave to remain secure during the migration process, and also allows the destination host to decrypt the contents of the enclave upon receiving the contents and upon receiving the VM that includes the enclave. The approach allows for the VM to continue execution on the destination host. The enclave retains its state from source host to destination host. Applications using the enclave in the source host are able to continue using the enclave on the destination host using the data migrated from the source host to the destination host.

14 Claims, 4 Drawing Sheets

SUPPORTING MIGRATION OF VIRTUAL MACHINES CONTAINING ENCLAVES

RELATED APPLICATIONS

Benefit is claimed under 35 U.S.C. 119(a)-(d) to Foreign Application Serial No. 201941029237 filed in India entitled "SUPPORTING MIGRATION OF VIRTUAL MACHINES CONTAINING ENCLAVES", on Jul. 19, 2019, by VMWARE, INC., which is herein incorporated in its entirety by reference for all purposes.

BACKGROUND

Data centers may utilize virtual machines (VMs) that run within host computers. Deployment of VMs within hosts allows an efficient use of the host's resources, such as CPU cycles, memory, etc. VMs run on top of virtualization software, such as a hypervisor. A VM may contain an enclave, which uses a trusted execution environment implemented by the hardware on which the VM is running. Information within an enclave is inaccessible to code that is running outside of the enclave. For example, if the hypervisor of the host attempts to read from the enclave, the hypervisor will obtain null or random data.

A VM may need to be migrated from one host to another. To migrate a VM, a hypervisor copies all memory pages of the VM and transfers the memory pages to a destination host. However, if the VM contains an enclave, then the hypervisor is unable to copy the memory pages of the enclave, because those memory pages are inaccessible to the hypervisor. The inability of the hypervisor to copy enclave memory pages interferes with the VM migration process.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for migrating the contents of an enclave, together with a virtual machine comprising the enclave, from a source host to a destination host. The approach provides a technique that allows the contents of the enclave to remain secure during the migration process, and also allows the destination host to decrypt the contents of the enclave upon receiving the contents and the VM that hosts the enclave. The approach allows for the VM to continue execution on the destination host. The enclave retains its state from source host to destination host. Applications using the enclave in the source host are able to continue using the enclave on the destination host using the data migrated from the source host to the destination host.

Figure 1A:
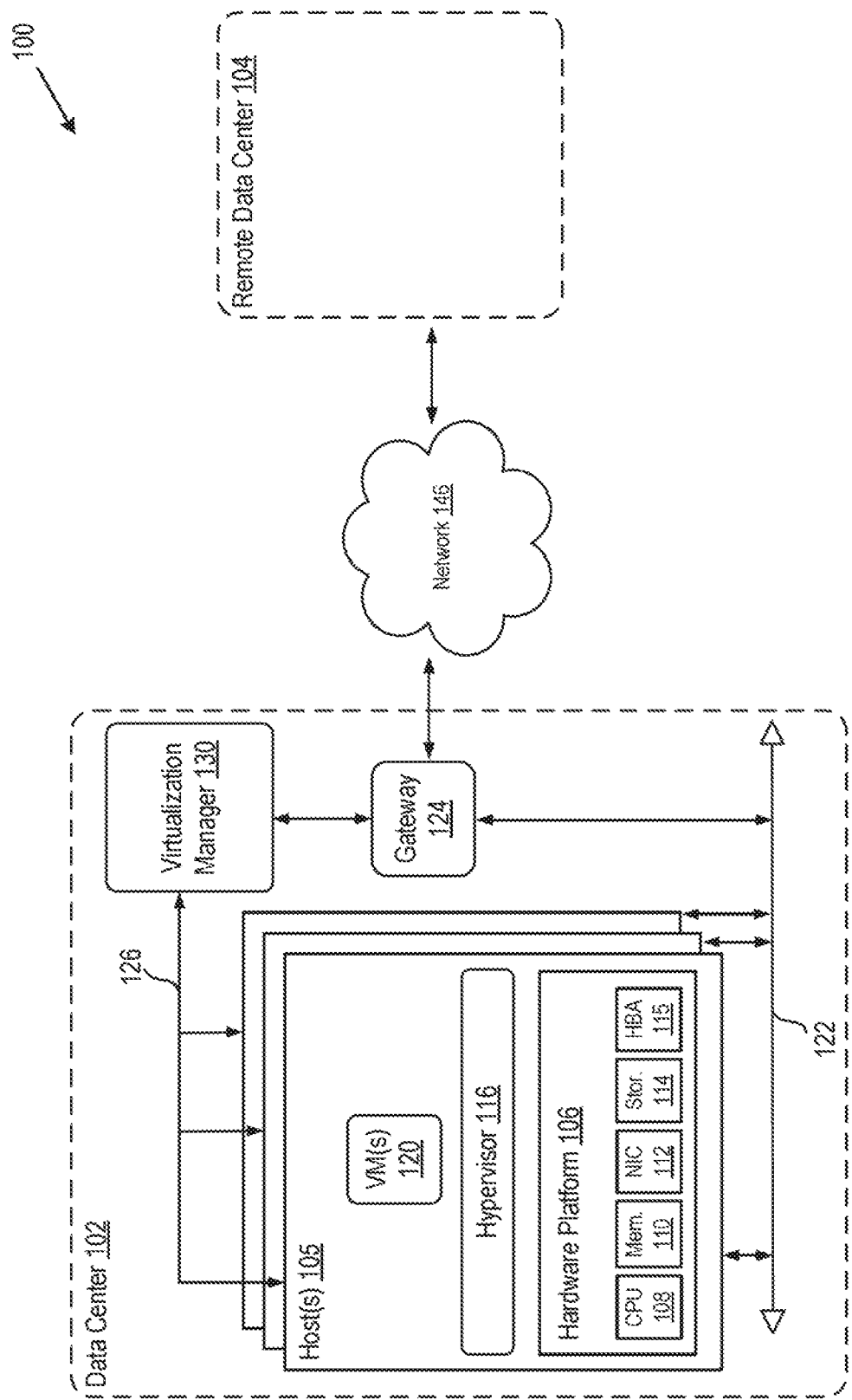
FIG. 1A depicts a block diagram of a computer system in which one or more embodiments of the present disclosure may be utilized, according to an embodiment.

FIG. 1A depicts a block diagram of a computer system 100 in which one or more embodiments of the present disclosure may be utilized, according to an embodiment. As shown, computer system 100 includes data center 102 and optionally, a remote data center 104, connected by a network 146. Remote data center 104 may be substantially similar to data center 102. Network 146 may be, for example, a direct link, a local area network (LAN), a wide area network (WAN) such as the Internet, another type of network, or a combination of these.

Data center 102 includes host(s) 105, a virtualization manager 130, a gateway 124, a management network 126, and a data network 122. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack. Host 105 is configured to provide a virtualization layer or virtualization system/software, also referred to as a hypervisor 116, that abstracts processor, memory, storage, and networking resources of hardware platform 106 into one or more virtual machines 120 (collectively referred to as VMs 120 and individually referred to as VM 120) that run concurrently on the same host. Rather than hypervisor 116, or in addition to hypervisor 116, a virtual machine monitor (VMM) may be used to provide a virtualization layer between hardware platform 106 and VMs 120. As used herein, the terms hypervisor 116 and VMM may be used interchangeably.

Hypervisor 116, through abstraction, implements or emulates virtualized components of VM 120. Hypervisor 116 is logically interposed between VMs 120 and hardware platform 106. Hypervisor 116 may run on top of the operating system in host 105 or directly on hardware platform 106 of host 105. In some implementations, the hypervisor may comprise system level software as well as a "Domain 0" or "Root Partition" virtual machine, which is a privileged machine that has access to the physical hardware resources of the host. In this implementation, a virtual switch, along with hardware drivers, may reside in the privileged virtual machine. One example of hypervisor 116 is a VMware ESXi™ hypervisor provided as part of the VMware vSphere® solution made commercially available from VMware, Inc. of Palo Alto, Calif. Although certain aspects are described with respect to VMs, it should be noted that the techniques discussed herein may similarly be applied to other types of virtual computing instances (VCIs) such as containers.

Hardware platform 106 of each host 105 may include components of a computing device such as one or more processors (CPUs) 108, system memory 110, a network interface 112, storage system 114, a local host bus adapter (HBA) 115, and other I/O devices such as, for example, a mouse and keyboard (not shown).

CPU 108 is configured to execute instructions, for example, executable instructions that perform one or more operations described herein and that may be stored in memory 110 and in storage 114. CPU 108 may be enabled with a set of CPU instruction codes (e.g., extensions) that enable the creation of trusted execution environments or enclaves within memory 110. The enclaves created through extension of CPU 108 may be protected or secured from code executing outside of the enclave by mechanism of CPU 108, at the hardware level. Enclaves are further discussed below with reference to FIG. 1B. The set of CPU extensions may be, for example, part of Intel Software Guard Extensions (SGX) or ARM TrustZone.

Network interface 112 enables host 105 to communicate with other devices via a communication medium, such as network 122 or network 126. Network interface 112 may include one or more network adapters, also referred to as Network Interface Cards (NICs), for connecting to one or more physical networks. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

Storage system 114 represents local persistent storage devices (e.g., one or more hard disks, flash memory modules, solid state disks, and/or optical disks). HBA 115 couples host 105 to one or more external storages (not shown), such as a storage area network (SAN). Other external storages that may be used include network-attached storage (NAS) and other network data storage systems, which may be accessible via NIC 112.

Memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random-access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 105 via a network, shown as a management network 126, and carries out administrative tasks for data center 102 such as managing hosts 105, managing local VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a VM in one of hosts 105. One example of a virtualization manager is the vCenter Server™ product made available from VMware, Inc. VM migration discussed herein may be performed by VM migration methods known in the art, such as the method described in U.S. patent application Ser. No. 13/760,868, filed Feb. 6, 2013, or the method described in U.S. Pat. No. 9,870,324, issued Jan. 16, 2018. The entire contents of both of these documents are incorporated by reference herein.

In an embodiment, virtualization manager 130 includes a hybrid cloud management module (not shown) configured to manage and integrate virtualized computing resources provided by remote data center 104 with virtualized computing resources of data center 102 to form a unified computing platform. The hybrid cloud manager module is configured to deploy VMs in remote data center 104, transfer VMs from data center 102 to remote data center 104, and perform other "cross-cloud" administrative tasks. In one implementation, hybrid cloud manager module is a plug-in complement to virtualization manager 130, although other implementations may be used, such as a separate computer program executing in a central server or running in a VM in one of hosts 105. One example of hybrid cloud manager module is the VMware vCloud Connector® product made available from VMware, Inc.

Gateway 124 provides VMs 120 and other components in data center 102 with connectivity to network 146 used to communicate with remote data center 104. Gateway 124 may manage external public IP addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual computing instance, a physical device, or a software module running within host 105. Gateway 124 may include two gateways: a management gateway for management network 126 and a data gateway for data network 122.

Figure 1B:
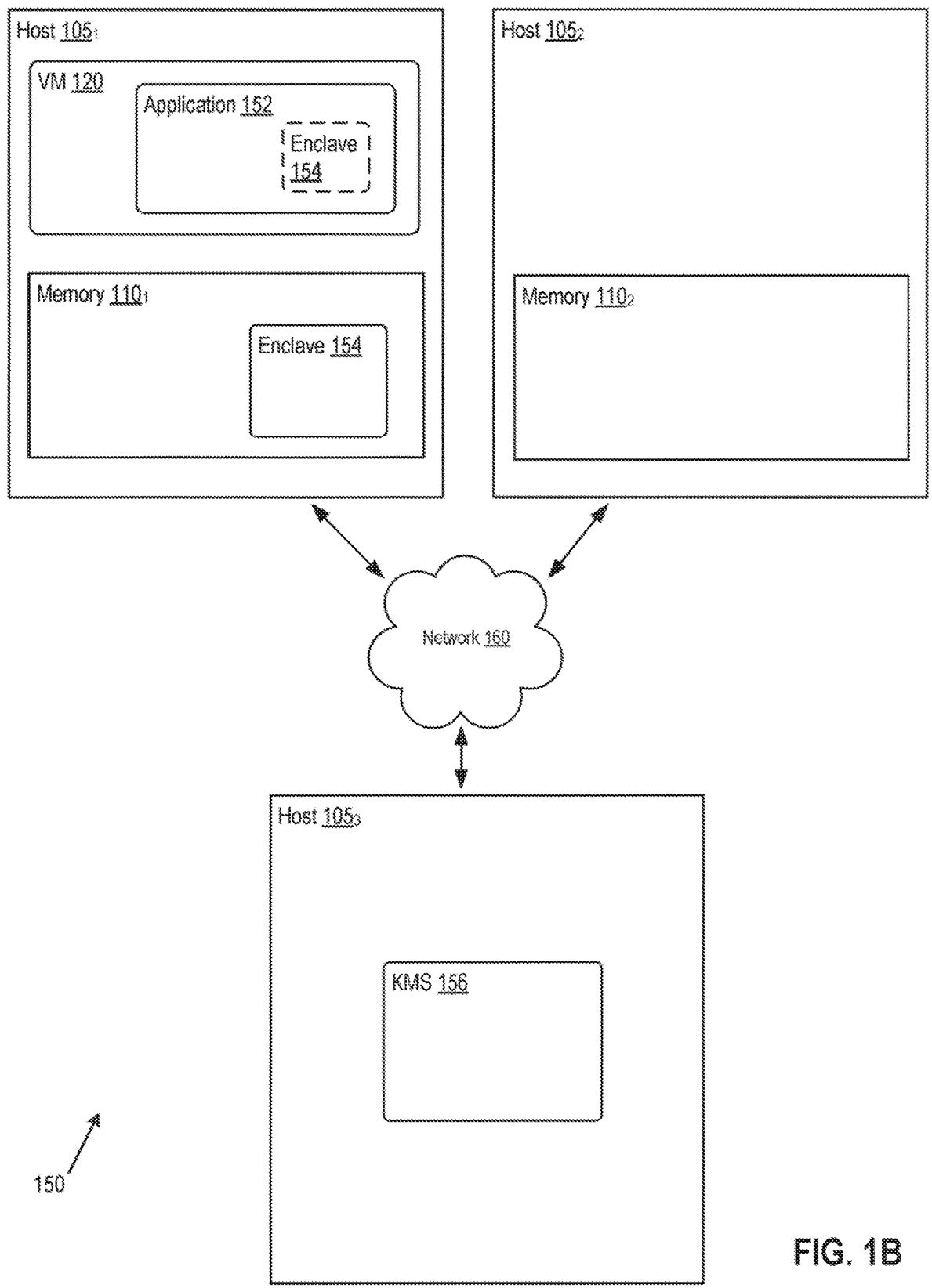
FIG. 1B depicts a block diagram of a computer system in which one or more embodiments of the present disclosure may be utilized, according to an embodiment.

FIG. 1B depicts a block diagram of a computer system 150 in which one or more embodiments of the present disclosure may be utilized, according to an embodiment. System 150 is an exemplary embodiment of system 100 of FIG. 1A. System 150 comprises a plurality of hosts 105 connected by network 246. Network 246 may be network 126, 122, or 146 shown in FIG. 1A, or network 246 may be a combination of these and/or other networks. Although FIG. 1B shows three hosts 105, any number of hosts 105, two or more, is possible within system 150. Each host 105 may be within the same data center 102, or may be located within a plurality of data centers, such as data centers 102 and 104, and/or other data centers.

In FIG. 1B, host $105_1$ may be regarded as a "source host" from which VM 120 is migrated to a "destination host" $105_2$. Host $105_1$ comprises VM 120 and memory $110_1$. Memory $110_1$ comprises an isolated and trusted execution environment referred to herein as enclave 154.

Enclave 154 is a protected area in the address space of application 152 (see FIG. 1B). Enclave 154 is a memory region that is accessible to code executing outside of enclave 154 only through (a) entry points 164 (see FIG. 1C), or (b) predefined CPU instructions or extensions of CPU 108. Without the use of an entry point 164, enclave 154 is either inaccessible to code executing outside of enclave 154 (e.g., hypervisor 116), or if accessible, then code executing outside of enclave 154 perceives data within enclave 154 as random data and/or as encrypted data. Accesses to memory area of enclave 154 from any code or software not located in enclave 154 are prevented by CPU 108, but code executing outside of enclave 154 may access memory area of enclave 154 by calling code, such as through entry point 164, that is located within enclave 154.

Code executing within enclave 154 and data located within enclave 154 are protected from code executing outside of enclave 154, even if the code is running at higher privilege levels that code within enclave 154. Enclave 154 may be implemented or created through a hardware mechanism, such as through the set of CPU instruction codes (e.g., extensions) that are part of Intel SGX. For example, an SGX-enabled CPU 108 may protect the integrity and confidentiality of the computation inside enclave 154 by isolating the enclave's code and data from the outside environment, including operating system and/or hypervisor of host 105, and hardware devices attached to the system bus of host 105. Execution flow can only enter enclave 154 via special CPU instructions. Enclave execution happens in a protected mode, and uses the address translation set up by hypervisor 116 and/or operating system kernel, such as the kernel of a guest operating system of VM 120. Hardware platform 106, such as CPU 108, may maintain additional address translation mappings, such as for example, the translation mappings in an enclave page cache map (EPCM) of an SGX-enabled CPU. Additional information on implementing enclave 154 can be found in McKeen et al., *Innovative Instructions and Software Model for Isolated Execution*, HASP '13 Proceedings of the 2nd International Workshop on Hardware and Architectural Support for Security and Privacy, Article No. 10, Jun. 23-24, 2013, hereby incorporated by reference in its entirety.

VM 120 of host $105_1$ comprises one or more applications 152. Application 152 may be any software, and may for example, have a need for a secure and trusted execution environment that is inaccessible to components of host $105_1$. For example, application 152 may be an authentication module that authenticates participants of system 150, and to secure authentication data from tampering by the operating system of VM 120 or host 105, application 152 may set up enclave 154 to store code and data for the purpose of performing the authentication. Application 152 logically maps enclave 154 into the address space of application 152, as shown by dotted lines of enclave 154 within application 152. The mapping may be done by, for example, page tables within hypervisor 116 of host $105_1$. Application 152 is unable to access code or data within enclave 154 without the use of entry points 164 (see FIG. 1C). In an embodiment, application 152 creates enclave 154 through an extension of CPU 108. Application 152 may have or create one or more enclaves 154.

System 150 comprises a key management service (KMS) 156. Although KMS 156 is shown on FIG. 1B as located within a third host $105_3$, KMS 156 may be located within any host 105 of system 150 or 100. KMS 156 manages encryption and decryption keys for system 150 by securely storing encryption and decryption keys, and when requested by components of system 150, providing the encryption and decryption keys. A key may be, for example, an array of bits.

Figure 1C:
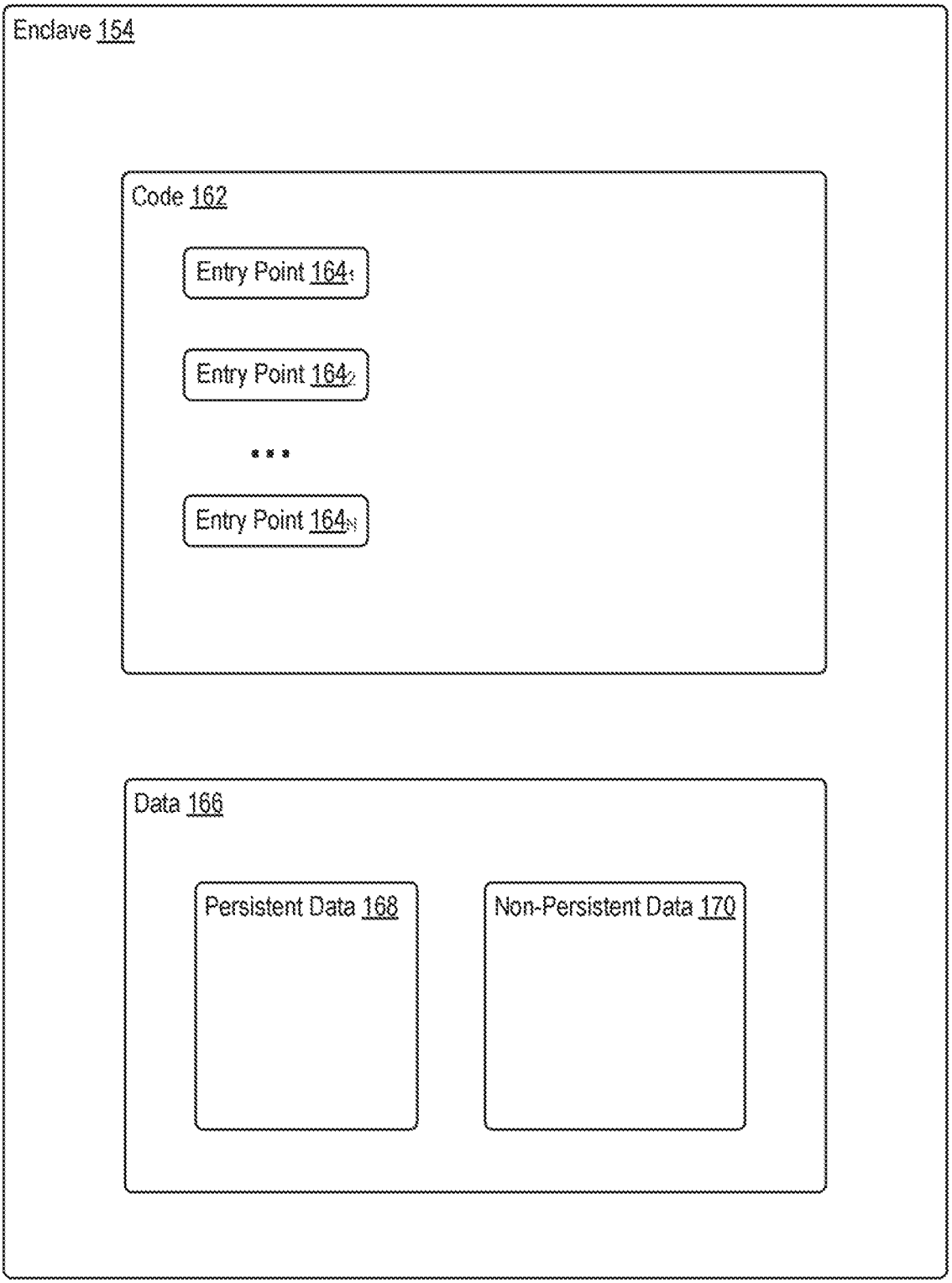
FIG. 1C depicts a block diagram of an expanded view of exemplary enclave, according to an embodiment.

FIG. 1C depicts a block diagram of an expanded view of exemplary enclave 154, according to an embodiment. Enclave 154 comprises code 162 and data 166. Code 162 is the executable logic of enclave 154. Code 162 comprises entry points 164. Entry point 164 is a function that performs an action, such as a calculation using data 166 or other data. In an embodiment, entry point 164 is a predefined entry point 164. Optionally, entry point 164 accepts parameters when called. Optionally, entry point 164 returns data, such as a result of a calculation using data 166 or other data. Code 162 can access, read from, and write to data located outside of enclave 154. Entry point 164 may call other functions within enclave 154.

Data 166 may be non-executable data, may be executable data such as functions callable by one of entry points 164, or a combination of non-executable and executable data. Data 166 is accessible only through one of entry points 164. Data 166 comprises persistent data 168 and non-persistent data 170. In an embodiment, data 166 comprises one of persistent data 168 or non-persistent data 170. Persistent data 168 is data that creates a state of enclave 154. A "state" of enclave 154 is a condition or quality of enclave 154 at a given time, such that the outputs of entry points 164 differ depending on the what persistent data 168 is present within enclave 154 at the given time. Enclave 154 that has state may be referred to as a "stateful" enclave 154. Without persistent data 168, enclave 154 may be considered a "stateless" enclave 154, such that the outputs of entry points 164 do not depend on what persistent data 168 is present within enclave 154. When VM 120 is migrated from source host 105 to destination host 105, persistent data 168 is data that is required (i.e., needs to persist) for code 162 of enclave 154 to maintain state. Non-persistent data 170 is data that is not required (i.e., does not need to persist) for enclave 154 to maintain state.

As used herein, enclave 154 has "state" or is "stateful" if enclave 154 remembers preceding events or user interactions: the remembered information is called the state. The state of enclave 154 is stored as variables or constants. As code 162 of enclave 154 executes, the state of persistent data 168 may change, i.e., variables may change and the values that are stored in memory 110 may also change.

In an embodiment, persistent data 168 is data that is available after application 152 is closed, and non-persistent data 170 is data that is not available after application 152 is closed.

Figure 2:
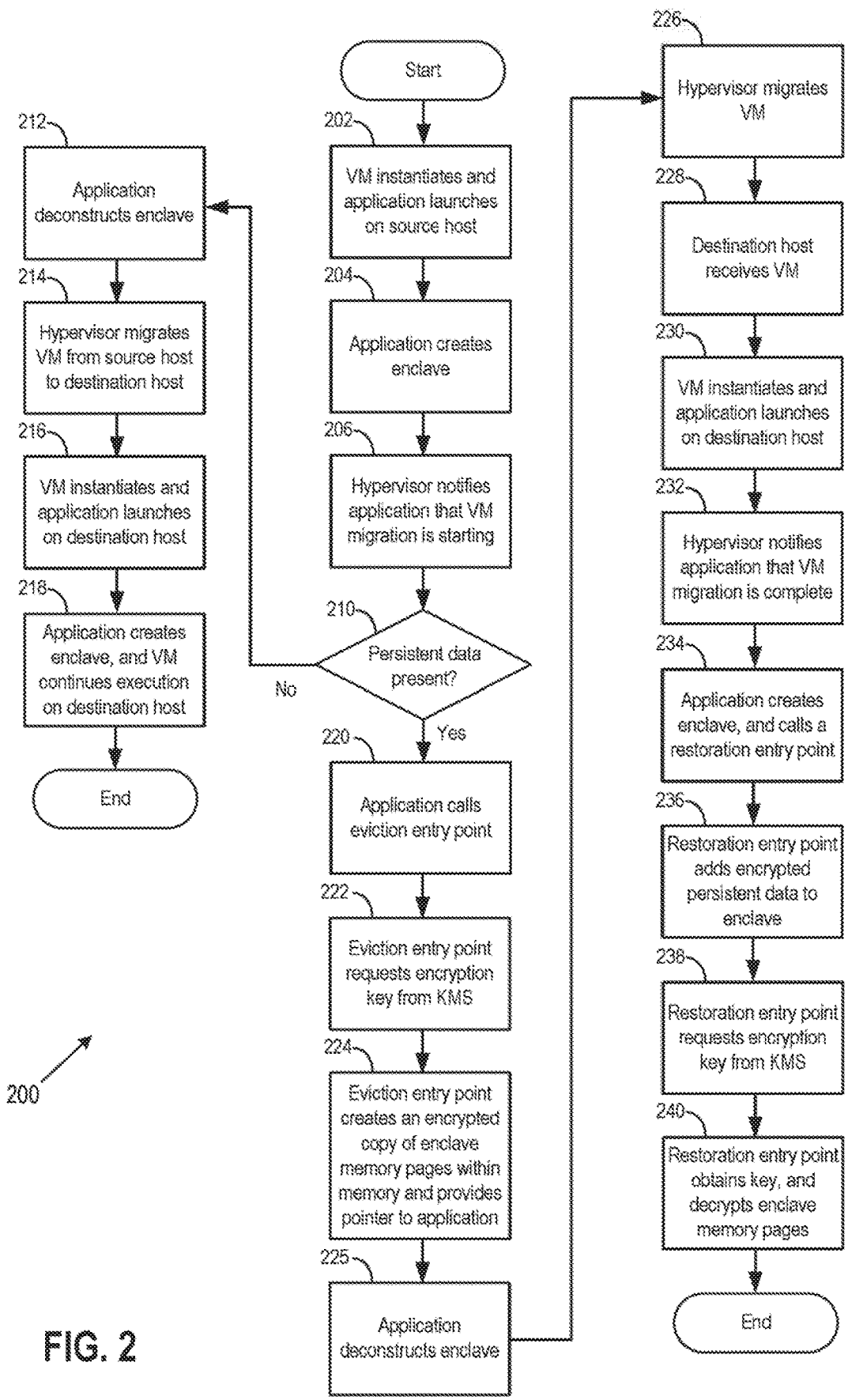
FIG. 2 depicts a flow diagram of a method of migrating a virtual machine that comprises an enclave, according to an embodiment.

FIG. 2 depicts a flow diagram of a method 200 of migrating VM 120 that comprises an enclave 154, according to an embodiment. For the purpose of illustrating method 200, host $105_1$ may be regarded as a "source host" from which VM 120 is migrated to a "destination host" $105_2$, as shown in FIG. 1B.

At block 202, VM 120 instantiates on source host $105_1$. As part of block 202, application 152 launches on source host $105_1$.

At block 204, application 152 creates enclave 154, such as by sending an instruction call, through a CPU extension described above, to CPU 108 of source host $105_1$.

At block 206, migration of VM 120 of host $105_1$ is initiated, such as by virtualization manager 130 and/or an administrator of system 100. As part of block 206, hypervisor 116 of source host $105_1$ notifies application 152 that the process of migrating VM 120 from host $105_1$ has initiated.

At block 210, application 152 determines whether enclave 154 comprises persistent data 168. Application 152 may query enclave 154 to determine whether enclave 154 comprises persistent data 168. The querying may be performed by, for example, calling an entry point 164 that determines whether enclave 154 comprises persistent data 168, and the entry point 164 returns the result of its determination to application 152. If enclave 154 comprises persistent data (e.g., if enclave 154 is a stateful enclave), then method 200 continues to block 220. If enclave 154 does not comprise persistent data (e.g., if enclave 154 is a stateless enclave), then method 200 continues to block 212.

At block 212, application deconstructs enclave 154 without saving any information regarding enclave 154 and/or information stored within enclave 154. The deconstruction may be performed by, for example, an instruction call to CPU 108 of host $105_1$, the call being made through an extension of CPU 108.

At block 214, hypervisor 116 of host $105_1$, in conjunction with virtualization manager 130, migrates VM 120 from source host $105_1$ to destination host $105_2$ using VM migration methods known in the art.

At block 216, VM 120 instantiates on destination host $105_2$. As part of block 216, application 152 launches on destination host $105_2$. Block 216 is similar to block 202, but on destination host $105_2$ rather than on source host $105_1$.

At block 218, application 152 recreates enclave 154, such as by sending an instruction call, through a CPU extension described above, to CPU 108 of destination host $105_2$. Block 218 is similar to block 204, but on destination host $105_2$ rather than on source host $105_1$. After block 218, method 200 ends.

At block 220, application 152 calls an eviction entry point 164 within code 162 of enclave 154. Block 220 is reached if persistent data is present within enclave 154, and therefore, the persistent data is to be migrated to destination host $105_2$ along with VM 120. Eviction entry point 164 is a custom entry point within enclave 154 that encrypts and evicts persistent data 168 in a way that allows destination host $105_2$ to decrypt and rebuild enclave 154. The function of eviction entry point 164 is discussed below.

At block 222, eviction entry point 164 requests an encryption key from KMS 156. Optionally, as part of the request, eviction entry point 164 provides an identifier of source host $105_1$ and/or destination host $105_2$. Eviction entry point 164 may obtain an identifier of source host $105_1$ and/or destination host $105_2$ as one or more arguments specified in the call to the eviction entry point 164 by, for example, application 152. Eviction entry point 164 may provide an identifier of destination host $105_2$ as part of the request, so that when an entry point 164 on destination host $105_2$ requests a decryption key from KMS 156, KMS 156 will be able to determine the correct decryption key to provide by matching identifiers.

As part of block 222, KMS 156 provides an encryption key to eviction entry point 164. Before receiving an encryption key from KMS 156, eviction entry point 164 or enclave 154 attests itself to KMS 156 to prove identity, such as by following a remote attestation protocol specific to the trusted hardware implementation. In an embodiment, the encryption key is ephemeral, generated by KMS 156 the single migration of enclave 154. The encryption key may be cryptographically tied specifically to the instance of enclave 154 that is being migrated. In an embodiment, the encryption key is not associated with CPU 108 of source host $105_1$ or destination host $105_2$, and the key is not maintained or managed by CPU 108 of source host $105_1$ or destination host $105_2$. In an embodiment, entry points 164 communicate with KMS 156 using a secure channel. The secure channel may include point-to-point encryption techniques, such as those of Internet Protocol Security (IPSec).

At block 224, eviction entry point 164 creates a copy of persistent data 168, such as by creating a copy of memory pages storing persistent data 168. Eviction entry point 164 encrypts the copy using the key obtained from KMS 156 at block 222. Eviction entry point 164 places the encrypted persistent data 168 into memory $110_1$ of source host $105_1$, outside of enclave 154. In an embodiment, the encrypted persistent data 168 is placed into a portion of memory $110_1$ that is memory of VM 120. Placing encrypted persistent data 168 into memory $110_1$ makes the encrypted persistent data 168 accessible to hypervisor 116. Eviction entry point 164 then provides, to application 152, a pointer (e.g., memory address) of the location of encrypted persistent data within memory $110_1$.

At block 225, application 152 deconstructs enclave 154. The deconstruction may be performed by, for example, an instruction call to CPU 108 of host $105_1$, the call being made through an extension of CPU 108.

At block 226, hypervisor 116 of source host $105_1$, migrates VM 120, together with encrypted persistent data 168 to destination host $105_2$. Optionally, before the migration, application 152 provides the pointer obtained at block 224 to hypervisor 116 of source host $105_1$. The migration may be performed in conjunction with virtualization manager 130. In an embodiment, the encryption key that was obtained at block 222 is not transmitted from source host $105_1$ to destination host $105_2$.

At block 228, destination host $105_2$ receives VM 120, along with encrypted persistent data 168.

At block 230, VM 120 instantiates on destination host $105_2$. As part of block 230, application 152 launches on destination host $105_2$. Block 230 is similar to block 202, but occurs on destination host $105_2$ rather than on source host $105_1$.

At block 232, hypervisor 116 of destination host $105_2$ notifies application 152 that migration of VM 120 is complete.

At block 234, application 152 creates a new enclave 154, such as by sending an instruction call, through a CPU extension described above, to CPU 108 of destination host $105_2$. Block 234 is similar to block 204, but on destination host $105_2$ rather than on source host $105_1$. As part of block 234, application 152 calls a restoration entry point 164 within code 162 of new enclave 154. Restoration entry point 164 is a custom entry point within new enclave 154 that is configured to decrypt and add previous persistent data 168 to new enclave 154. The function of restoration entry point 164 is discussed below. As part of calling restoration entry point 164 by application 152, application 152 passes a pointer, which points to persistent data 168, to restoration entry point 164, such as through an argument of restoration entry point 164. Optionally, application 152 may obtain a pointer to persistent data 168 from hypervisor 116 of destination host $105_2$.

At block 236, restoration entry point 164 adds or moves encrypted persistent data 168 into new enclave 154 created on destination host $105_2$ at block 234. The encrypted persistent data 168 is copied by the enclave's restoration entry point 164 into enclave memory before decryption takes place.

At block 238, restoration entry point 164 requests an encryption key from KMS 156. Optionally, as part of the request, restoration entry point 164 provides an identifier of source host $105_1$ and/or destination host $105_2$. KMS 156 determines the correct decryption key to provide to restoration entry point so as to decrypt the data 168 encrypted by the key of block 222, above. The determination may be made, for example, by matching one or more identifiers provided in request of block 222 to one or more identifiers provided in request of block 236. As part of block 236, KMS 156 provides a decryption key to restoration entry point 164. The decryption key may be the same key as that provided in block 222. In an embodiment, the decryption key is not associated with CPU 108 of source host $105_1$ or destination host $105_2$, and the key is not maintained or managed by CPU 108 of source host $105_1$ or destination host $105_2$.

At block 240, restoration entry point 164 obtains the decryption key and decrypts persistent data 168 that was encrypted at block 224 and migrated at block 226. As part of block 240, migrated VM 120 continues execution on destination host $105_2$. After block 240, method 200 ends.

The present approach is a technical solution to a technical problem, with the practical application of enabling the migration of a virtual computing instance that includes an enclave. The present approach allows the use of enclaves in virtual computing instances that need to be migrated, improving the security of the virtual computing instances, which is a specific function improving computer technology and the functioning of the computer itself.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of migrating a virtual machine (VM) from a first host to a second host, the VM comprising a first enclave within a memory of the first host, the VM further comprising an application running within the VM, the VM running on a virtualization software that abstracts hardware of the first host, the method comprising:

calling, by the application, an eviction entry point located within the first enclave, wherein the calling comprises providing an identifier associated with the second host to the eviction entry point;

requesting, by the eviction entry point, an encryption key from a key management service, wherein requesting the encryption key comprises providing the identifier associated with the second host to the key management service;

encrypting, by the eviction entry point, persistent data of the first enclave using the encryption key requested from the key management service;

placing the encrypted persistent data outside of the first enclave;

migrating the VM and the encrypted persistent data to the second host;

creating a second enclave within the second host;

requesting, by a restoration entry point located within the second enclave, a decryption key from the key management service based on the identifier associated with the second host;

decrypting, by the restoration entry point located within the second enclave, the encrypted persistent data using the decryption key requested from the key management service; and adding to the second enclave, by the restoration entry point, the decrypted persistent data.

2. The method of claim 1, the method further comprising:
notifying the application, by the virtualization software, of initiation of a migration process of the VM; and
based at least in part on the notifying, performing the calling, by the application, of the eviction entry point located within the first enclave.

3. The method of claim 2, wherein the second host comprises a second virtualization software, the method further comprising:
notifying the application, by the second virtualization software, of completion of the migration process of the VM; and
based at least in part on the notifying, performing the creating the second enclave within the second host.

4. The method of claim 1, further comprising:
determining by the application that the first enclave is a stateful enclave; and
based at least in part on the determining, performing the calling, by the application, the eviction entry point located within the first enclave.

5. The method of claim 1, wherein the key management service is executing on a third host.

6. A non-transitory computer readable medium comprising instructions to be executed in a processor of a computer system, the instructions when executed in the processor cause the computer system to carry out a method of migrating a virtual machine (VM) from a first host to a second host, the VM comprising a first enclave within a memory of the first host, the VM further comprising an application running within the VM, the VM running on a virtualization software that abstracts hardware of the first host, the method comprising:

calling, by the application, an eviction entry point located within the first enclave, wherein the calling comprises providing an identifier associated with the second host to the eviction entry point;

requesting, by the eviction entry point, an encryption key from a key management service, wherein requesting the encryption key comprises providing the identifier associated with the second host to the key management service;

encrypting, by the eviction entry point, persistent data of the first enclave using the encryption key requested from the key management service;

placing the encrypted persistent data outside of the first enclave;

migrating the VM and the encrypted persistent data to the second host;

creating a second enclave within the second host;

requesting, by a restoration entry point located within the second enclave, a decryption key from the key management service based on the identifier associated with the second host;

decrypting, by the restoration entry point located within the second enclave, the encrypted persistent data using the decryption key requested from the key management service; and adding to the second enclave, by the restoration entry point, the decrypted persistent data.

7. The non-transitory computer readable medium of claim 6, the method further comprising:
notifying the application, by the virtualization software, of initiation of a migration process of the VM; and
based at least in part on the notifying, performing the calling, by the application, of the eviction entry point located within the first enclave.

8. The non-transitory computer readable medium of claim 7, wherein the second host comprises a second virtualization software, the method further comprising:
notifying the application, by the second virtualization software, of completion of the migration process of the VM; and
based at least in part on the notifying, performing the creating the second enclave within the second host.

9. The non-transitory computer readable medium of claim 6, wherein the method further comprises:
determining by the application that the first enclave is a stateful enclave; and
based at least in part on the determining, performing the calling, by the application, the eviction entry point located within the first enclave.

10. The non-transitory computer readable medium of claim 6, wherein the key management service is executing on a third host.

11. A computer system comprising:
a first host comprising a memory, a virtualization software, a hardware, and a virtual machine (VM);
a second host; and
at least one processor, wherein the at least one processor is programmed to carry out a method of migrating the VM from the first host to the second host, the VM comprising a first enclave within the memory of the first host, the VM further comprising an application running within the VM, the VM running on the virtualization software that abstracts the hardware of the first host, the method comprising:

calling, by the application, an eviction entry point located within the first enclave, wherein the calling comprises providing an identifier associated with the second host to the eviction entry point;

requesting, by the eviction entry point, an encryption key from a key management service, wherein requesting the encryption key comprises providing the identifier associated with the second host to the key management service;

encrypting, by the eviction entry point, persistent data of the first enclave using the encryption key requested from the key management service;

placing the encrypted persistent data outside of the first enclave;

migrating the VM and the encrypted persistent data to the second host;

creating a second enclave within the second host;

requesting, by a restoration entry point located within the second enclave, a decryption key from the key management service based on the identifier associated with the second host;

decrypting, by the restoration entry point located within the second enclave, the encrypted persistent data using the decryption key requested from the key management service; and adding to the second enclave, by the restoration entry point, the decrypted persistent data.

12. The computer system of claim 11, the method further comprising:

notifying the application, by the virtualization software, of initiation of a migration process of the VM; and based at least in part on the notifying, performing the calling, by the application, of the eviction entry point located within the first enclave.

13. The computer system of claim 12, wherein the second host comprises a second virtualization software, the method further comprising:

notifying the application, by the second virtualization software, of completion of the migration process of the VM; and based at least in part on the notifying, performing the creating the second enclave within the second host.

14. The computer system of claim 11, wherein the method further comprises:

determining by the application that the first enclave is a stateful enclave; and based at least in part on the determining, performing the calling, by the application, the eviction entry point located within the first enclave.

* * * * *